(12) United States Patent
McGoogan et al.

(10) Patent No.: US 7,155,709 B2
(45) Date of Patent: Dec. 26, 2006

(54) DISPLAYING USER READABLE INFORMATION DURING LINKING

(75) Inventors: Sean McGoogan, Bristol (GB); Richard Shann, Chepstow (GB)

(73) Assignee: STMicroelectronics Limited, Bristol (GB)

( * ) Notice: Subject to any disclaimer, the term of this patent is extended or adjusted under 35 U.S.C. 154(b) by 195 days.

(21) Appl. No.: 10/103,655

(22) Filed: Mar. 20, 2002

(65) Prior Publication Data

US 2003/0106048 A1 Jun. 5, 2003

(30) Foreign Application Priority Data

Mar. 21, 2001 (EP) .................... 01302643

(51) Int. Cl.
*G06F 9/44* (2006.01)
*G06F 3/00* (2006.01)

(52) U.S. Cl. ................. 717/162; 717/125; 719/331

(58) Field of Classification Search ........ 717/162–167, 717/124, 125; 719/331
See application file for complete search history.

(56) References Cited

U.S. PATENT DOCUMENTS

| | | | | |
|---|---|---|---|---|
| 5,519,866 A | * | 5/1996 | Lawrence et al. ........... 717/162 |
| 5,764,987 A | | 6/1998 | Eidt et al. ................... 395/701 |
| 5,973,687 A | * | 10/1999 | Foley et al. ................ 715/866 |
| 6,219,830 B1 | * | 4/2001 | Eidt et al. ................... 717/139 |
| 6,298,479 B1 | * | 10/2001 | Chessin et al. ............. 717/164 |
| 6,314,564 B1 | * | 11/2001 | Charles et al. ............. 717/162 |
| 6,687,899 B1 | * | 2/2004 | Shann ......................... 717/162 |
| 6,704,928 B1 | * | 3/2004 | Shann ......................... 717/162 |
| 2001/0047512 A1 | * | 11/2001 | Szewerenko et al. ......... 717/10 |
| 2002/0046396 A1 | * | 4/2002 | Knoll .......................... 717/124 |
| 2004/0070785 A1 | * | 4/2004 | Ferlitsch .................... 358/1.15 |

FOREIGN PATENT DOCUMENTS

WO   WO 94/22078   9/1994

OTHER PUBLICATIONS

Jonathan B. Rosenberg, "How Debuggers Work", 1996, John Wiley & Sons Inc., ISBN 0-471-14966-7, Chapter 8.*
John R. Levine, "Linkers and Loaders", 2000, Academic Press, ISBN 1-55860-496-0, Chapter 7.*
"Understanding Computers: Input/Output", 1986, Time-Life Books, ISBN 0-8094-5666-4, p. 32.*
Stephen Prata, "C Primer Plus", 1998, Sams Publishing, ISBN 1-57169-161-8, Section: Chapter 2; Introducting C.*

* cited by examiner

*Primary Examiner*—Tuan Dam
*Assistant Examiner*—J. Derek Rutten
(74) *Attorney, Agent, or Firm*—Lisa K. Jorgenson; E. Russell Tarleton; Seed IP Law Group PLLC (57) ABSTRACT

A method of forming an executable program from a plurality of object code modules where each object code module includes a plurality of relocation instructions having at least one information output relocation with a field indicating information to be output. The method includes reading a relocation instruction from one of the object code modules and, when the read relocation instruction is an information output relocation, displaying the information indicated in the field in a human readable form.

20 Claims, 8 Drawing Sheets

DISPLAYING USER READABLE INFORMATION DURING LINKING

BACKGROUND OF THE INVENTION

1. Field of the Invention

The present invention relates a method of forming an executable program by linking a plurality of object modules, and in particular to a method displaying information during linking.

2. Description of the Related Art

Linkers for producing executable programs are known. Generally speaking, a linker acts to link a number of object code modules to form a single executable program. Object code modules are usually generated from program source code modules, these modules being written in a high level language. An assembler/compiler reads each source code module and assembles and/or compiles the high level language of the source code module to produce an object code module. The assembler also generates a number of relocations that are used to combine the object code modules at link time in a linker.

The ELF (executable linking format) standard defines a convention for naming relocation sections belonging to a given section, e.g., rela.abc is relocation section of section abc. Standard relocations under the ELF format allow an offset in section data to be defined where patching is to occur and a symbol whose value is to be patched. A type field also exists which is used to describe the appropriate method of encoding the value of the symbol into the instruction or data of the section data being patched. According to the existing arrangements, the relocation type definitions are usually created on an ad hoc basis for each instruction set targeted. The 32-bit ELF standard allows only 256 distinct relocation types, so the same types are re-ascribed to different semantics for each instruction set.

One difficulty with existing linkers is that if the linker operation is not successful it is difficult to discover at what point in the linking process an error occurred, or what values particular parameters were when an error occurred.

BRIEF SUMMARY OF THE INVENTION

The disclosed embodiments of the present invention provide a method of linking a plurality of object code modules to form an executable program in which more information is provided to a user. Although the embodiments of the present invention described hereinafter are described in the context of the ELF Standard, it will be appreciated by a skilled person that the invention is equally applicable to other known linking formats.

According to an aspect of the present invention there is provided a method of forming an executable program from a plurality of object code modules, each object code module comprising a plurality of relocation instructions including at least one information output relocation having a field indicating information to be output, the method comprising: reading a relocation instruction from one of said object code modules; and when said read relocation instruction is an information output relocation, displaying the information indicated in said field in a human readable form.

The information output relocation may have an associated condition parameter. In this case the method further comprises determining the value of the condition parameter and only displaying the information when the condition parameter is a predetermined value.

The condition parameter may be an expression that is evaluated during the determining step, or alternatively the condition parameter is a reference to a symbol, the symbol having a predetermined value.

Preferably the field of the information output relocation contains the information to be displayed.

More preferably, the field of the information output relocation contains a reference to the storage location, the storage location holding the information to be displayed and the information output relocation retrieving that stored information.

The displayed information may be a prompt for the user to input further information, in which case forming the executable program is halted until a further input is supplied. It may be terminated in response to the further input or when the information is displayed.

Preferably the information to be displayed includes an indicator string associated with a stored information item and the stored information item is substituted for the indicator string when the information is displayed. The information output relocation may include a field indicating the associated stored data item. The indicator string may include a character or sub-string denoting the format in which the information item is to be displayed.

Existing linkers do not provide a facility for displaying information in human readable form during linking. Such a display of information would be particularly useful for de-bugging operations. For example, predetermined error messages may be displayed in response to particular conditions being found to be valid, the conditions being evaluated by the linker at linker time. By having the facility to display messages to a user, this information may be obtainable to assist in de-bugging the individual object code modules and/or the final executable program. Furthermore, the displayed messages may additionally provide a prompt to the user requiring a further input, thus enabling the user to control the linking operation while it is in process.

BRIEF DESCRIPTION OF THE SEVERAL VIEWS OF THE DRAWINGS

For a better understanding of the present invention and to show how the same may be carried into effect, reference will now be made by way of example to the accompanying drawings.

FIG. 1 is a block diagram illustrating the context of the invention;

FIG. 2 is a sketch illustrating the layout of the special relocations;

FIG. 3 is a block diagram of a linker;

FIG. 4 is a schematic diagram illustrating one example of the use of special relocations to implement calculations;

FIG. 5 is a schematic diagram illustrating the display of information according to an embodiment of the present invention; and FIG. 6 is a schematic diagram illustrating the display of information responsive to the evaluation of a condition according to a further embodiment of the present invention.

FIG. 7 is a schematic diagram illustrating the display of information and a user prompt according to a further embodiment of the present invention.

FIG. 8 is a schematic diagram illustrating the hard-copy outputting of information and termination according to a further embodiment of the present invention.

DETAILED DESCRIPTION OF THE INVENTION

Figure 1:
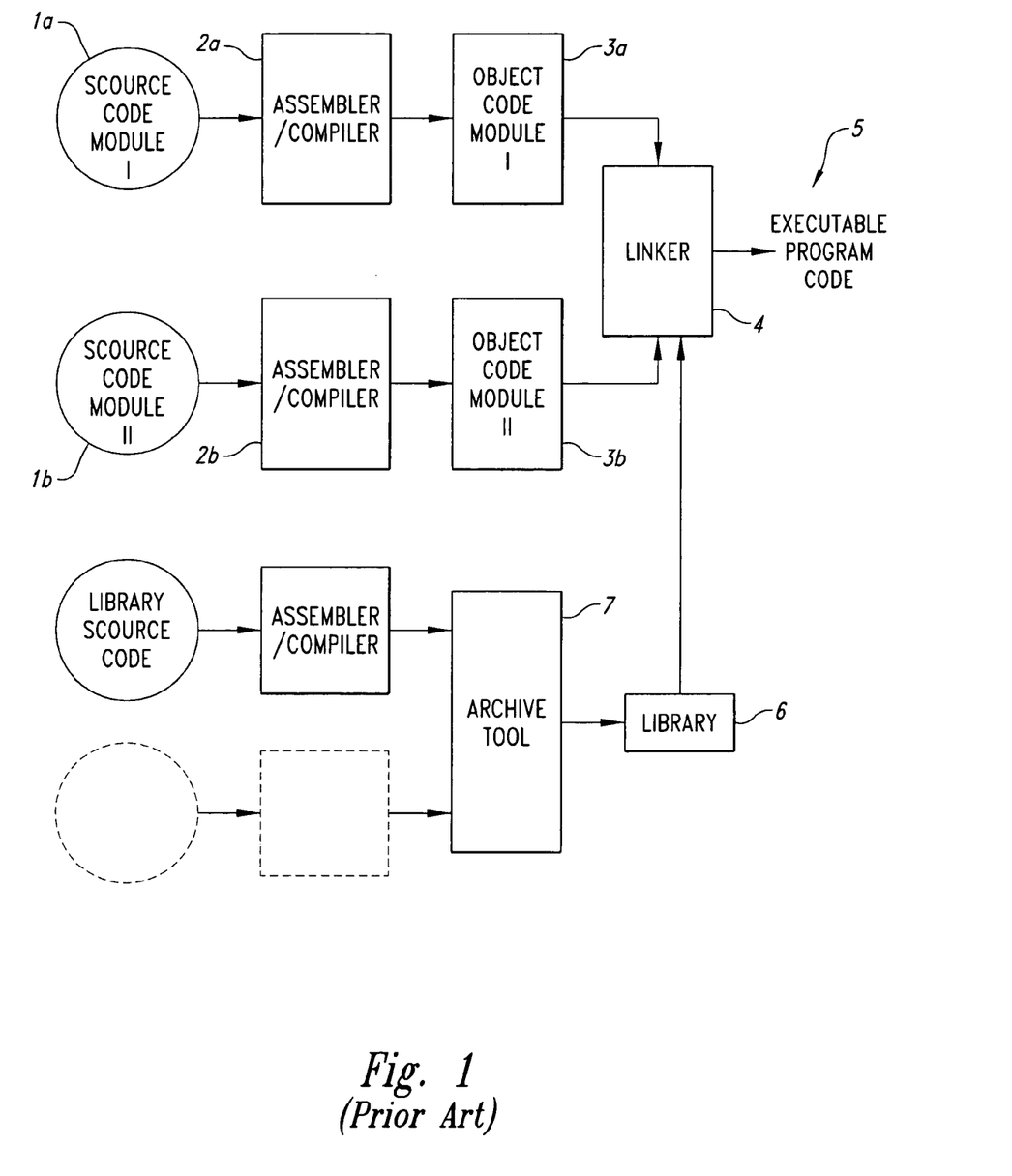

With reference to FIG. 1, a system for linking a number of program modules to form a single executable program is shown schematically. A number of program source code modules 1a, 1b, each module written in a high level language, is provided. The particular high level language used for each source code module may vary from module to module, or alternatively all of the program source code modules may be written in the same high-level language. Each source code module 1a, 1b, is input to a respective assembler/compiler 2a, 2b that assembles and/or compiles the high level language of the source code module to produce an object code module 3a, 3b. Each object code module 3a, 3b is the low level language equivalent to each respective source code module 1a, 1b, the low level language being a language that is directly readable by a target computer into which the final resulting single executable program is to be loaded. It will be appreciated that a single assembler/compiler could be used to convert a number of source code modules to respective object code modules.

Each object code module 3a, 3b is passed to a linker 4. Object code modules may be stored in libraries, such as the library 6 in FIG. 1, placed under the control of an archive tool 7. Access to these object code modules by the linker 4 is explained later. The linker combines all of the respective object code modules 3a, 3b to produce a single executable program, still in the low level language suitable for the target processor into which the program is to be loaded.

For a given architecture there are often different instruction sequences for achieving the same objective depending on the values of the operands that are being handled. For example, "load a function address into a register" may be achieved in various ways depending on the address in question. When the operand is unknown before link time there is scope for re-writing the code at link time depending on the value of the operand. This re-writing of the code is a form of optimization termed herein "linker relaxation."

In UK Patent Application No. GB 9920905.8 filed by the present applicant, a scheme is described for achieving linker relaxation based on information written in assembler files and passed to the linker as special relocations. The special relocations are also used for rewriting particular instruction sequences as one of a set of known alternatives.

Each assembler generates an object code module including sets of section data, each set of section data having a set of relocations generated by the assembler to describe how the section data is to be patched so as to render it compatible with other section data to form the program 5. The assembler generates these relocations. Section data comprises a plurality of code sequences executable in the final program, and the data values to be accessed by the executing program.

In particular a set of "relocations" to enable link time optimization of code is described. Conventionally a relocation describes the patching of section data with (encoded versions of) symbols. Such relocations are referred to herein as "bit relocations." In addition a number of so-called "special relocations" are discussed herein which are sometimes referred to in the following as "non-bit" relocations to distinguish from conventional "bit" locations.

It is assumed that a skilled reader is familiar with the ELF format and so only a very brief description will be given herein.

The ELF (executable and linking format) standard defines a convention for naming relocation sections belonging to a given section. For a section of name .xxx, the standard prescribes relocation sections .rel.xxx and .rela.xxx. The structure of these sections is defined and a partial semantic associated with them. Specifically an entry in .rel.xxx has:

(a) an offset field—the offset in the xxx section where the patching is to occur,
(b) a symbol field—the symbol whose value is to be patched, and
(c) a type field—an otherwise undefined type.

It is the type held that is used to describe the appropriate method of encoding the symbol value into the instruction or data of the .xxx section.

The .rela.xxx section is similarly defined but has an extra field (the addend) with the semantic that the addend is to be added to the symbol value before patching in.

In order to support the special relocations described in GB 9920905.8, a new type of relocation section is defined, with the naming convention .relo.xxx that is specifically intended to support optimizing at link time. In this way the .rel and .rela sections are left free to be used for conventional bit relocations.

Figure 2:
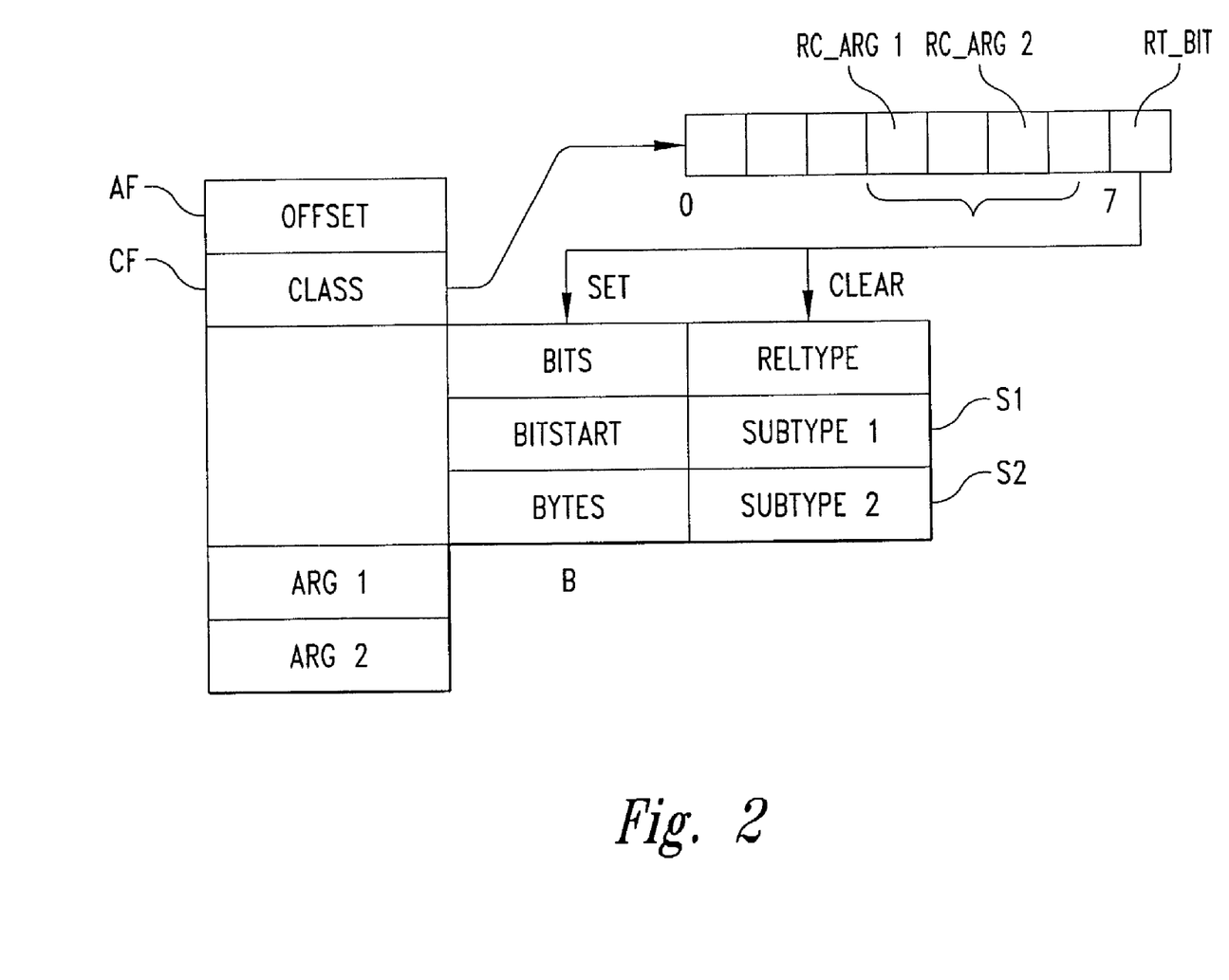

The format of an entry in the .relo section is given in Annexe 1 (it should be read in the context of the 32-bit ELF standard). It is illustrated in FIG. 2.

The underlying structure of the new type has an address field AF (r_offset), a classification field CF (r_class), 3 information fields which are labeled reltype, S1,S2 (1 byte each) for non-bit (NB) relocations and bit, bitstart, bytes for bit (B) relocations, and two one word arguments (r_arg1; r_arg2). The address field, classification field and arguments are common to both non-bit and bit relocations.

r Offset

The location at which to apply the relocation action. (That is, if this is the .relo.xxx section, then r_offset is the offset in the .xxx section where the relocation applies.)

r Class

The classification field indicates the type of relocation (bit or non-bit), and also conveys information about the use of the remaining fields.

In the classification field, bit 7 RT_BIT indicates a bit relocation if set (in which case the (B) information fields apply) or non-bit relocation if clear (in which case the (NB) information fields apply). Bits 3–6 specify whether the r_arg1,2 fields are a symbol index or a value. Table 1 (shown below) defines how the bits specify the interpretation of the r_arg1,2 fields.

TABLE I

| Name | RC_ARG1 | Meaning |
|---|---|---|
| RC_PARAM | 3 | r_arg1 is param |
| RC_VAL | 2 | r_arg1 is value |
| RC_SYM | 1 | r_arg1 is symbol |
| RC_UNUSED | 0 | r_arg1 is unused | r Arg1,2

The interpretation of these fields depends on bits 3–6 of the r_class field. Two bits RC_ARG1, RC_ARG2 are associated with each of r_arg1 and r_arg2. For bit relocations these two fields are normally used as symbol and addend.

For non-bit relocations the fields r_arg1,2 hold constant data being passed with a non-bit relocation. As with bit relocations bits 6 and 5 say whether they hold a symbol index or a value. The actual use of any symbol or value passed with a non-bit relocation depends on the nonbit reltype field. This may be an absolute value representing things such as alignment, register numbers etc. The semantics are given in the table of relocation types in Annexe 2.

The Bit (B) Type Fields r.bit.bits

The number of bits that are to be patched. A lowercase "b" is used to indicate this quantity in the name of a relocation.

r.bit.bitstart

The least significant bit number to be patched. A lower case "s" is used to indicate this quantity in the name of a relocation.

r.bit.bytes

The size in bytes of the object being patched. This information is needed for big endian targets in order to find which byte the least significant bit is to be found in, and where the higher order bits are. An upper case "B" is used to indicate this quantity in the name of a relocation.

Although the size in bytes of the object being patched is not necessary for little endian targets, it is still used to ensure consistency and compatibility.

Note that the following notation is used to name the bit relocations:

R b<val>s<val>B<val> where <val>'s represent the number of bits, start bit and number of bytes as specified by the r-bits, r.bitstart, r.bytes fields. For example R_b16s0B4 will patch the least significant two bytes of a four-byte object. This will be the bytes at offsets 0,1 or 3,2 depending on the target endianness.

The Non-bit (NB) Type Fields r.nonbit.reltype

This field describes what action the linker must perform. These include such things as executing an operation on the linker's internal stack of values, storing parameters to macros, conditionally deleting section data, etc., as described in more detail later.

r.nonbit.subtype1,2 (s1,2)

These fields hold values whose interpretation depends on the reltype field, and bits 3 to 6 of the classification field.

Figure 3:
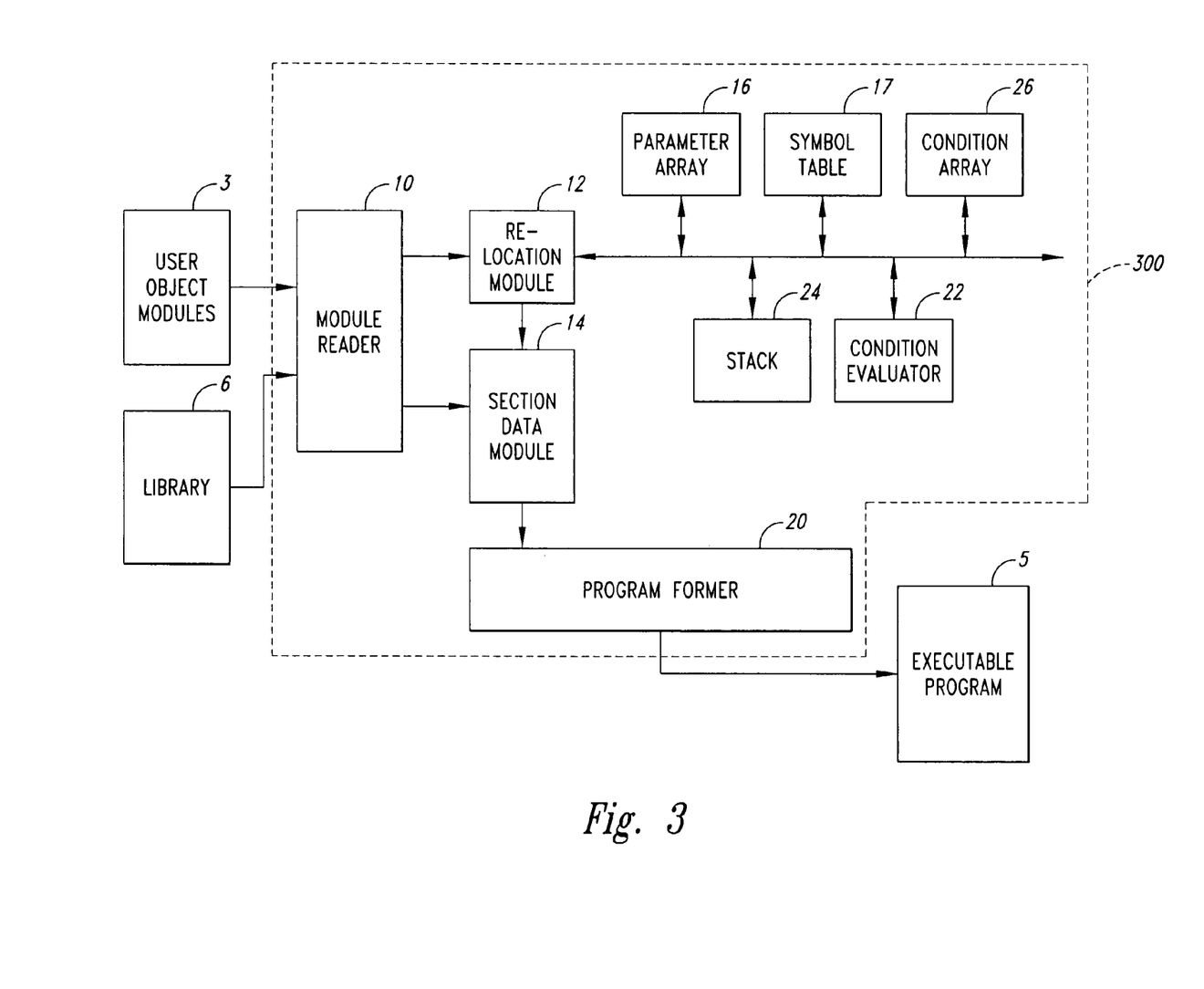

The above-described new type of relocation section supports a number of special relocations that allow a number of different functions to be performed by the linker. FIG. 3 is a block diagram of components of the linker that will be used to describe these additional functions. It will be appreciated that in practice the linker can be constituted by a suitably programmed microprocessor, such as a microprocessor 300. It will be understood therefore that the schematic blocks shown in FIG. 3 are for the purposes of explaining the functionality of the linker.

The linker comprises a module reader 10 that reads a set of incoming object files as user written code modules and library object files from the library 6. A relocation module 12 reads the relocations in the object code module. A section data module 14 holds section data from the object code module and allows patching to take place in response to relocation instructions in the object code module interpreted by the relocation module 12. The relocation module can also interpret special relocations and apply these to the section data held in the section data module 14. A program former 20 receives sequences from the section data module 14 and/or the library 18 depending on the actions taken by the relocation module 12 and forms the executable program 5 that is output from the linker 4. The linker also includes a condition evaluator 22 that operates in conjunction with a stack-type store 24. The condition evaluator reads the value of the top entry of the stack 24.

The linker also implements three arrays or tables as follows, a parameter array 16, a symbol table 17 and a condition array 26.

For the sake of completeness there follows the bit locations and non-bit relocations which are discussed in GB9920905.8 and which have application to embodiments of the present invention discussed herein.

Link Time Calculations

The first special relocation type that will be described allows arbitrary calculations to be passed to the linker by way of a number of special relocations that are defined by the reltype field of the new relocation format ELF32_relo. These relocations are numbered 6–29 in Annexe 2.

The set of the special relocation types listed in Annexe 2 allow the linker to support a general-purpose stack-based calculator. These relocations allow the value of symbols and constants to be pushed on the stack 24 and a designated manipulation to be performed. With the bits RC_ARG1 in the class field CF set to RC_UNUSED (see Table 1), binary operators act on the top two stack entries. Otherwise, the value passed and the top of stack (tos) entry is used. Unary operators operate on the top of the stack 24 (tos). Both pop their operands and place the result on the top of the stack. The full definition of the relocation types to support this is given in Annexe 2. There follows an example of their use.

Patch Symbol Plus Addend in 16-bit Target Integer

Figure 4:
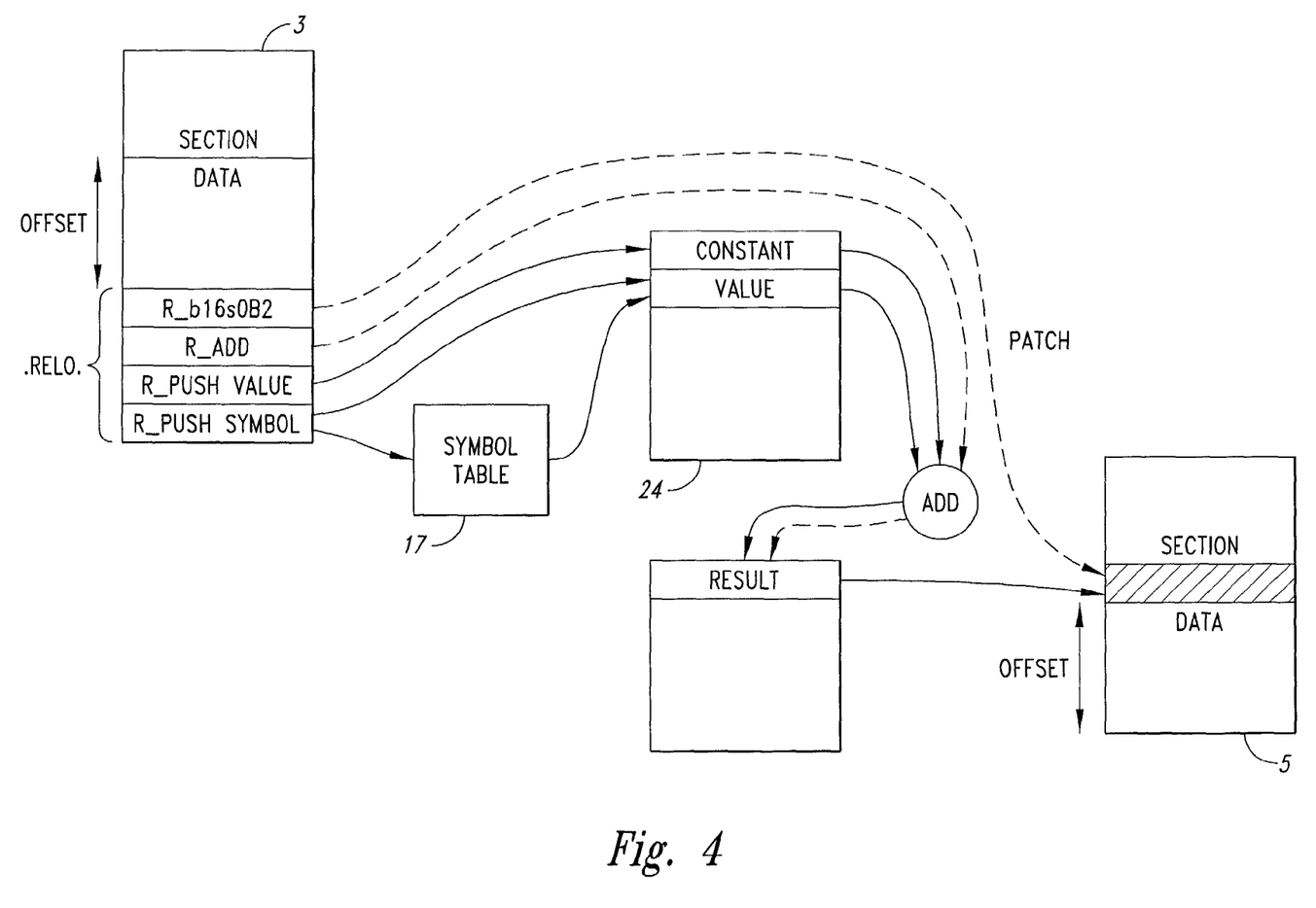

This could be accomplished by the following ordered sequence of relocations. The effect of the sequence is illustrated schematically in FIG. 4. FIG. 4 illustrates section data and its accompanying set of relocations forming part of an object code module 3. The relocations will be read in order from the bottom of the object code module 3 shown in FIG. 4. The listed relocations are:

| | |
|---|---|
| R_PUSH symbol | (a relocation to push value of symbol on stack) |
| R_PUSH value | (value relocation to push constant value on stack) |
| R_ADD | (pops top two values off stack, adds them and pushes the result back) |
| R_b16s0B2 | (patches the value popped from the top of stack into the section data, 16 bits are to be patched, starting at bit 0, in target object two byte wide) | all with the same offset (the offset of the integer to be patched in the section). The result of the patch is shown in the section data that forms part of the executable program 5.

The above relocations are implemented as described in the following with reference to FIGS. 3 and 4. The module reader 10 reads the section data and relocations. The section data is applied to the section data module 14 and the relocations are applied to the relocation module 12. The relocation module considers the first relocation, in this case R_PUSH symbol and acts accordingly to read the required value of the identified symbol from the symbol table 17 and push it onto the stack 24. The subsequent relocations are read, and the necessary action taken with respect to the stack as defined above. Finally, the last bit relocation R_b16s0B2 patches the final result value from the stack 24 into the 16-bit target integer. This patched section data is held in a section data module 14 ready for inclusion in the final program at the program former 20 unless, of course, some later relocations make further modifications prior to completion of linking.

As shorthand any operator can be accompanied by a symbol as one of its operands (the left hand operand in the case of binary operators). In that case the following sequence could be used:

| | |
|---|---|
| R_PUSH value | (relocation to push value on stack) |
| R_ADD symbol | (pop top add the value of the symbol and push back the result) |
| R_b16s0B2 | (patch section data, 16 bits, starting at bit 0, in target object two bytes wide using the value popped from top of stack) |

Conditional Section Data

Another set of the special relocations allows code sequences to be conditionally included in a final executable program. For now, it is assumed that all the possible alternative sequences are included in the section data of the object code module that the linker is currently examining. It will become clear later, however, that other possibilities exist for the alternative sequences.

In order to support the conditional section relocation, a number of new Assembler Directives are required as follows. These cause certain special relocations to be issued as described later.

LT_IF expr

Marks the start of a block of section data to be conditionally deleted. The condition is that expr should evaluate non-zero. The assembler issues the stack manipulation relocation 6–29 in Annexe 2 to push expr on the linker stack 24 and an R_IF relocation.

LT_ELSE

Marks the start of block of section data to be conditionally inserted/deleted. The condition is the previous LT_IF at the same level of nesting evaluated as zero. The assembler issues an R_ELSE relocation.

LT_CONDITION Condition Name Expr

The assembler issues the relocations to calculate the expr (that is, expr is on top of the stack). If condition_name has already appeared in an LT_CONDITION directive then the index associated with it is re-used. Otherwise the next unused index is chosen (initially 0). The assembler then issues R_STORE with that index. In this way, the condition array 26 can be constructed. After the condition_name has been associated with an index in this way it can be used in an expression in place of a constant or symbol. When used, the assembler issues R_FETCH with the index associated with condition name. That index is used to address the condition array 26. The scope of condition_name is the section where the LT_CONDITION directive occurs, from its point of first occurrence.

LT_ENDIF

Marks where normal linker processing re-starts after an LT_IF/LT_ELSE/LT_IF_FIXED (described later) directive. The assembler issues an R_ENDIF relocation.

The following are the special relocations used to support conditional section data deletions, which are issued by the assembler responsive to the conditional Assembler Directives.

R_IF

Causes the top entry to be popped from the linker's stack of values. If the value is zero then section data is skipped and the succeeding relocations are ignored until R_ELSE/R_ENDIF is encountered. If the value is non-zero then relocations are processed and instructions are not deleted until R_ELSE/R_ENDIF is encountered.

R_ENDIF

Defines the end of the relocations subject to the R_IF relocation, and of section data to be conditionally deleted subject to the R_IF relocation.

R_ELSE

If this is encountered while section data is being taken then section data is skipped and the succeeding relocations are ignored until R_ENDIF is encountered. If encountered while skipping due to R_IF then relocations are processed and instructions are no longer deleted until R_ENDIF is encountered.

R_STORE Index

A value is popped from the linker's stack of values. It is put in the condition array 26 kept by the linker for this purpose. The value is stored at the index passed with the relocation (in the nonbit.subtype field). This relocation avoids the overhead of passing the same calculation to the linker many times over.

R_FETCH Index

A value is pushed on the linker's stack of values. The value pushed is the value in the condition array 26 at the index passed with the relocation.

The following described embodiments of the present invention introduce two further new relocation instructions that allow information in a human readable form to be output by the linker at linker time. These new relocations will be referred to hereinafter as information output relocations. Although reference will only be made hereinafter to displaying the output information, it will be appreciated by those skilled in the art that the information may be output in any form, for example being displayed on a visual display unit or being printed.

In a first embodiment of the present invention the information output relocation may be expressed as:

R_PRINT String

In this case, the content of the field "string" is the actual information that is to be displayed. It will be appreciated that certain messages may be required to be repeatedly displayed in which case it is more efficient in terms of linker resources to express the relocation in the following manner.

R_PRINT Symbol

Figure 5:
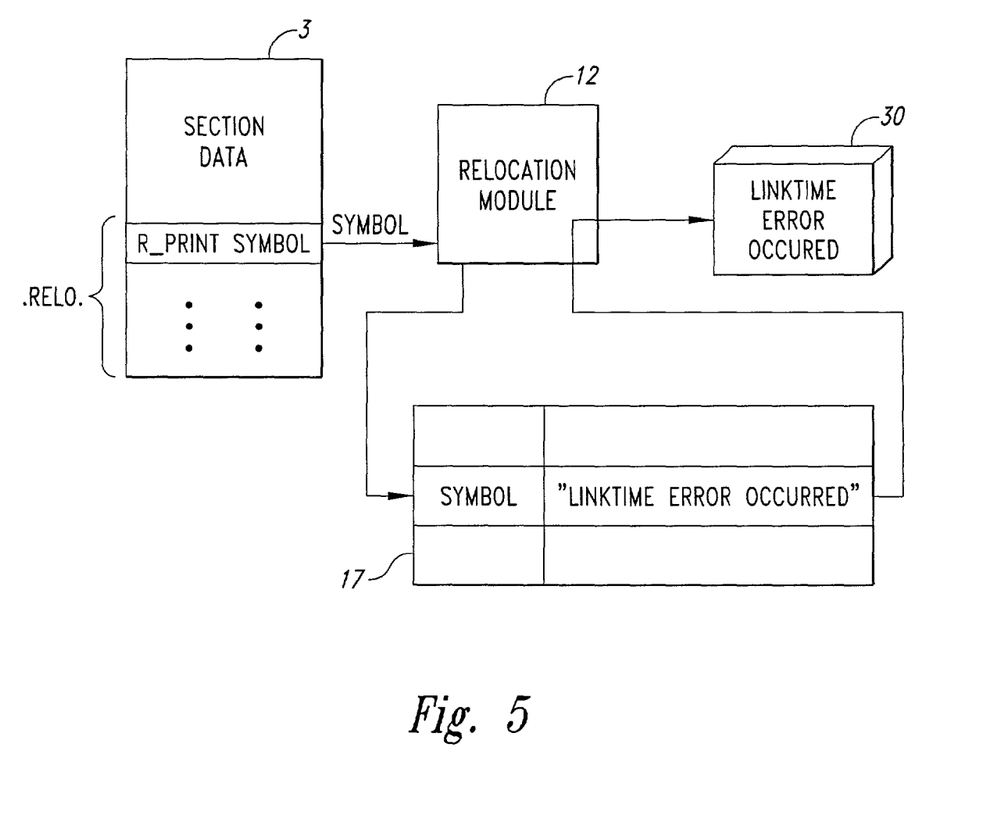

In this case the relocation field now contains a symbol name. The named symbol is stored in the symbol table 17 of the linker shown in FIG. 3. The symbol table contains the text string that is to be displayed. When the R_PRINT symbol relocation is executed the named symbol is looked up in the symbol table and the message string retrieved and displayed. This is illustrated schematically in FIG. 5. The R_PRINT symbol relocation is received by the relocation module 12 from the object code module 3. It will be appreciated that in practice this occurs via the module reader 10 as described above in relation to FIG. 3 but this is omitted here for the sake of clarity. The relocation module looks up the symbol named by the R_PRINT relocation in the symbol table 17 and issues the appropriate control commands to display the text string on a display apparatus 30.

Although the R_PRINT relocation may be invoked entirely independently of other relocation instructions, in preferred embodiments of the invention it is only invoked in response to a condition being met. The condition may be that a certain value of a symbol has been obtained for example. To determine whether or not the condition has been met the conditional relocation R_IF may be used as described earlier. In this case the R_PRINT relocation will be conditional on the value retrieved from the top of the stack by the preceding R_IF relocation. Only if the value retrieved from the top of the stack is non-zero will the R_PRINT relocation be executed. In order to support the R_PRINT relocation a new assembler directive is required that is expressed as either;

LT_PRINT string; or
LT_PRINT symbol.

In a second embodiment of the present invention an information output relocation is defined which has the same functionality as the combination of an R_IF and R_PRINT relocation described above. The second embodiment of the information output relocation may be expressed either as:

R_ASSERT symbol; or
R_ASSERT string.

As described above with reference to the first embodiment of the present invention, the field of the R_ASSERT relocation may contain either a string of text forming the actual message to be displayed or alternatively a named symbol, the symbol being held in the symbol table 17 and having the output information associated with it.

When the R_ASSERT relocation is executed by the linker the value from the top of the stack is retrieved and if the value is non-zero the symbol contents or string specified is displayed. In order to support the R_ASSERT relocation a new assembler directive is required that is expressed as either;

LT_ASSERT expression string; or
LT_ASSERT expression symbol.

When this directive is assembled by the assembler 2 a series of relocations of the type described earlier with reference to Link time Calculations is issued that will manipulate values on and off the stack to evaluate "expression" and leave the result on the top of the stack. The R_ASSERT relocation is then able to access the top of the stack and conditionally display the information or not, as the case maybe.

Figure 6:
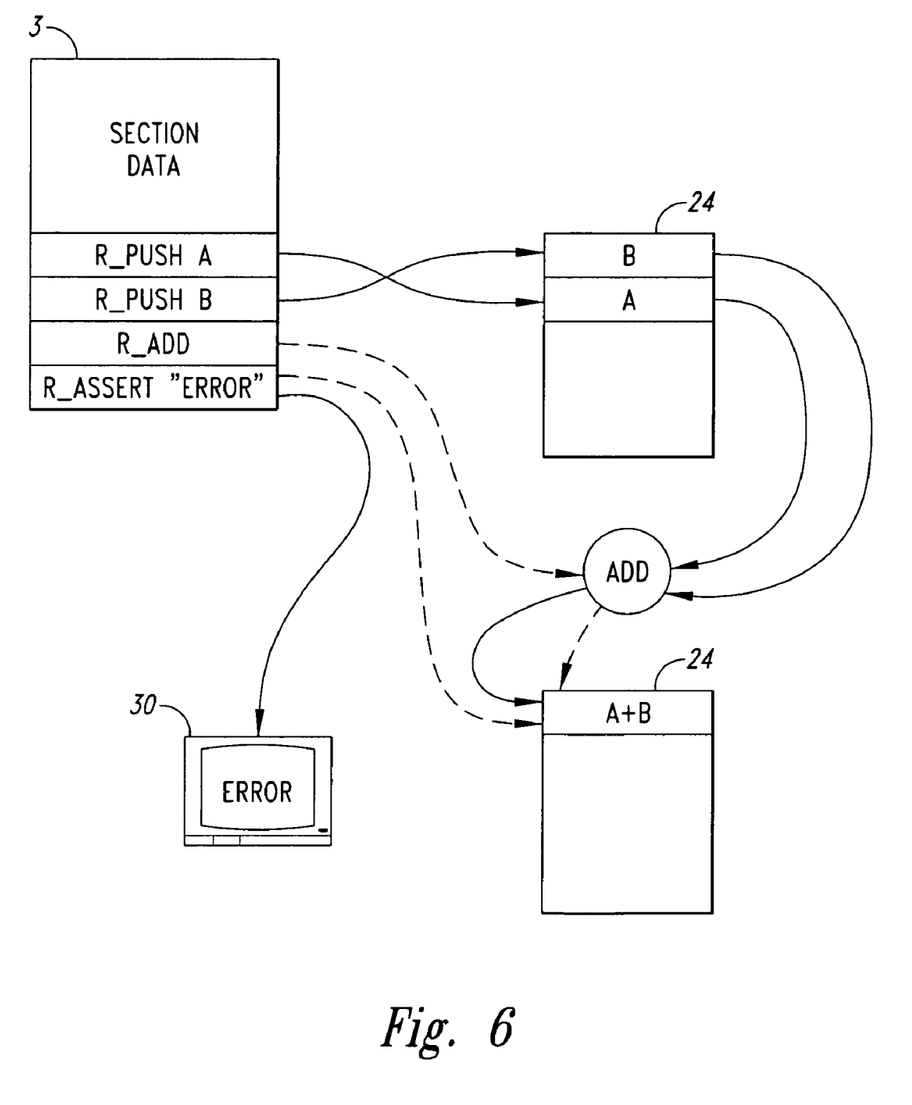

An example of this is now described with reference to FIG. 6. The condition expression to be evaluated is simply A+B. This gives rise to the following relocations in the object code modules:

R_PUSH A
R_PUSH B
R_ADD
R_ASSERT "error"

The relocations are executed in turn causing A and B to be pushed onto the top of the stack 24, an addition operation to occur and the result placed on the top of the stack. When the R_ASSERT "error" relocation is executed, the top entry of the stack 24 is examined and if the value is non-zero the specified string of the R ASSERT relocation is output to the display device 30.

Alternatively, the LT_ASSERT assembler directive may specify a symbol the value of which is to be retrieved, rather than an expression being evaluated. In this case the directive is expressed as:

LT_ASSERT condition symbol; or
LT_ASSERT condition string.

Where "condition" is the name of the symbol holding the value to be retrieved.

This generates a corresponding relocation R_ASSERT condition symbol or R_ASSERT condition string.

In this case, when the R_ASSERT relocation is executed by the linker the value of "condition" is retrieved from the symbol table and placed onto the top of the stack, where it is then evaluated and the message specified either displayed or not depending on the value of "condition".

Figure 7:
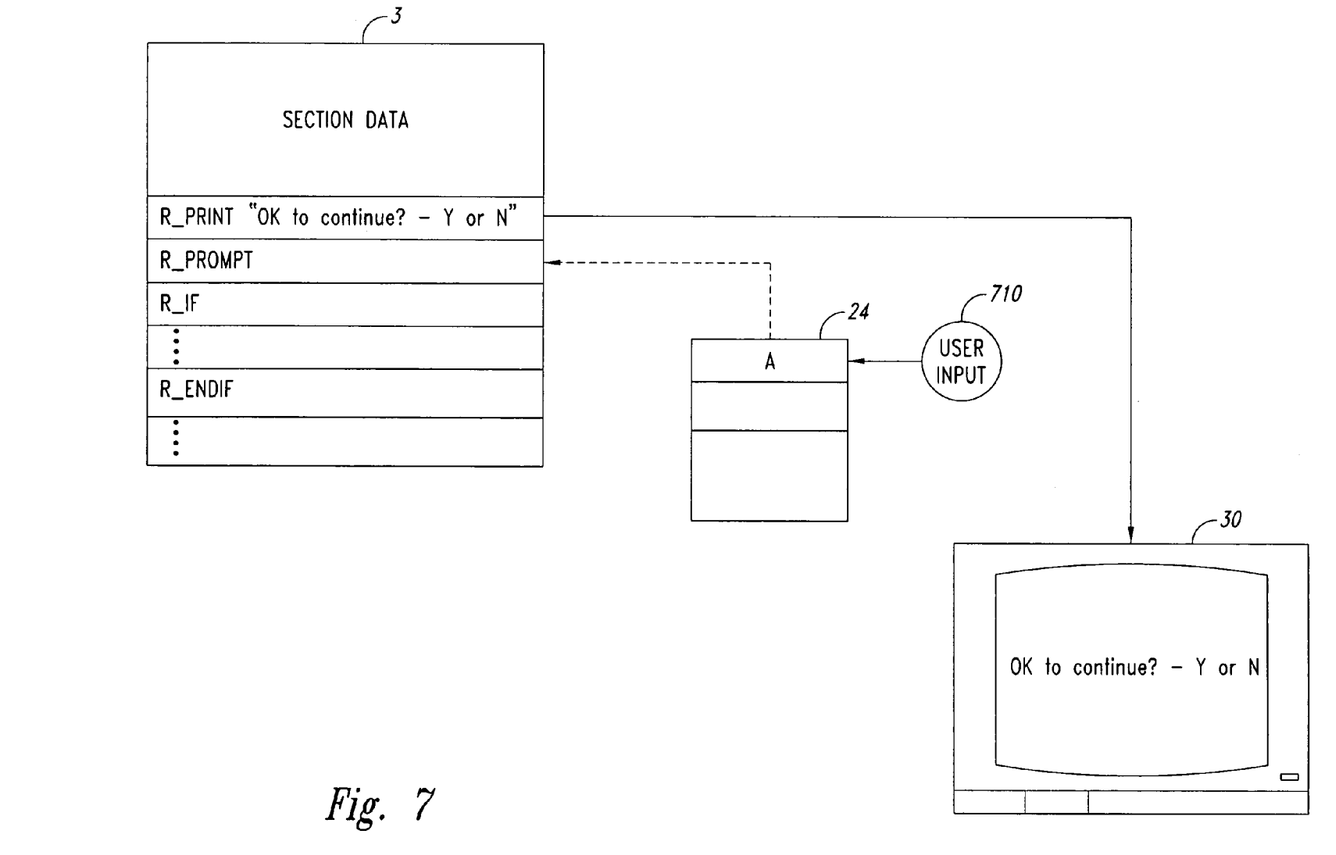

In a further embodiment of the present invention, when an R_ASSERT or R_PRINT relocation is executed, the linker may be paused until a further user input is provided. This allows the user to control the link process by choosing to ignore warning or error messages. An implementation of this further embodiment uses a further new relocation and corresponding directive R_PROMPT and LT_PROMPT. Execution of the R_PROMPT relocation causes the linker to wait for user input. The input is expected as an integer and is placed on top of the stack. The linker executes an R_IF relocation in dependence on the value of the input. An example using R_PROMPT is now described with reference to FIG. 7. This gives rise to the following relocation in the object code modules:

```
R_PRINT "OK to continue? - Y or N"
R_PROMPT
R_IF
***
R_ENDIF
***
```

The relocations are executed in turn causing "OK to continue?—Y or N" to be displayed on the display device 30. The linker may then be paused until further user input 710 is provided. When user input 710 is provided, it is pushed onto the stack 24 as A. The linker then executes an R_IF relocation in dependence on the value of the input.

Figure 8:
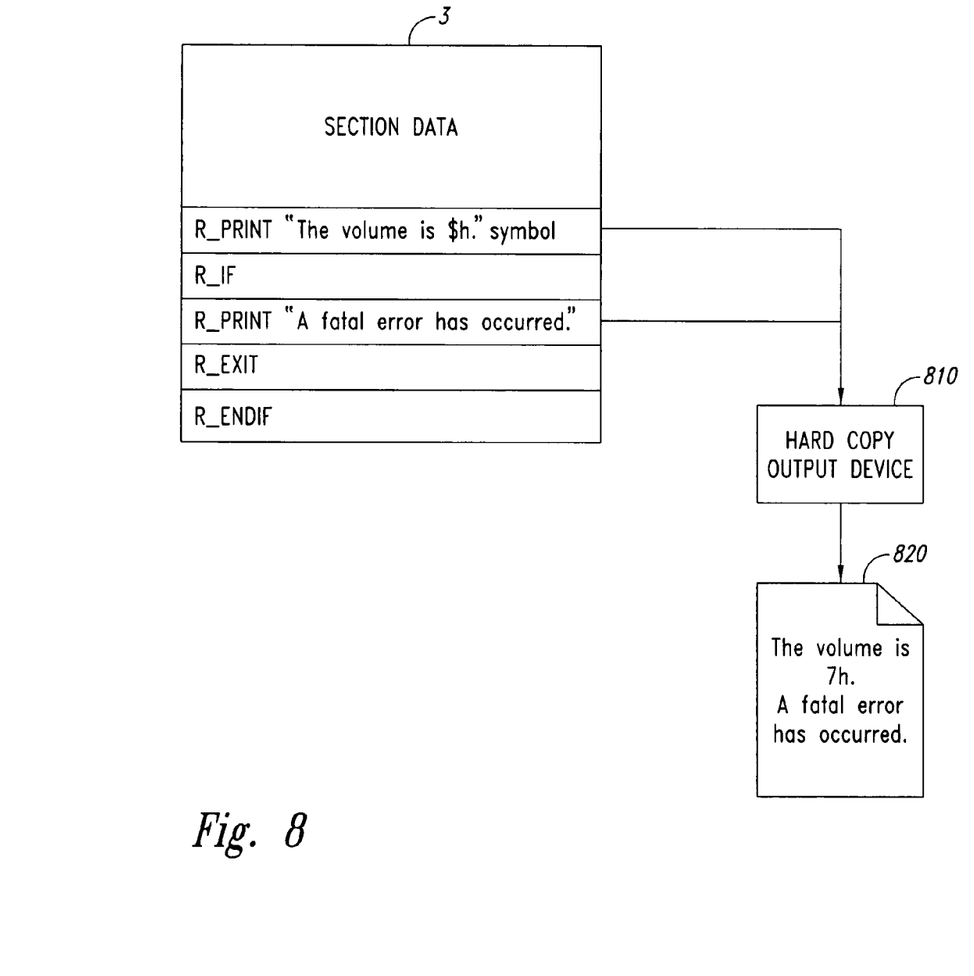

In another embodiment operation of the linker may be terminated completely following the display of a message. This may be accomplished by using a further relocation R_EXIT after the R_PRINT or R_ASSERT relocation. An example of this is now described with reference to FIG. 8. This gives rise to the following relocation in the object code modules

```
R_IF
    R_PRINT "A fatal error has occurred."
    R_EXIT
R_ENDIF
```

The relocations are executed in turn, such that when the R_IF relocation is executed, the message "A fatal error has occurred." may be sent to a hard copy output device 810. The hard copy output device 810 then outputs the message on a hard copy output 820. The program is then terminated.

```
***
R_IF
    R_PRINT "OK to continue - Y or N?"
    R-IF
        R_EXIT
    R_ENDIF
***
R_ENDIF
```

It would be advantageous to display variable numerical values, or values of symbols, within the messages to be displayed. This would allow the main text of the message to be fixed but still allow pieces of variable information to be inserted when the message was displayed. In embodiments of the present invention this may be accomplished by specifying a special character that may be placed in the message string immediately prior to a symbol or a variable storing the variable value, the special character denoting to the linker that the value of the specified symbol, or variable, should be substituted into the message. For example, R_PRINT "Volume is $symbol" will cause the linker to retrieve the value of "symbol" and substitute this for "$symbol". The choice of special character, in the above example $, is not important.

Alternatively, a further special symbol may be used to specify both that a value is to be substituted and how the data is to be displayed and the symbol storing the value may be specified as an argument to the R_PRINT relocation. An example of this is now described with reference to FIG. 8. This gives rise to the following relocation in the object code modules: R_PRINT "The volume is $h" symbol The relocation is executed, which causes the value denoted by "symbol" to be displayed in hexadecimal form on the hard copy output 820.

Annexe 1

```
typedef struct {
    Eif32_Addr r_offset;
    unsigned char r_class
    union {
        struct {
            unsigned char bits;
            unsigned char bitstart;
            unsigned char bytes;
        } bit;
        struct {
            unsigned char reltype;
            unsigned char subtype1;
            unsigned char subtype2;
        } nonbit;
    } r;
    Eif32_Word r_arg1;
    Eif32_Word r_arg2;
} Eif32_Relo;
```

Annexe 2

| Relocation Type Name | reltype | Meaning (C syntax is assumed) |
|---|---|---|
| R_NONE | 1 | No action is performed. |
| R_NOOPTIMISE | 2 | Optimization will be turned off from r_offset. |
| R_OPTIMISE | 3 | Optimization will be turned on from r_offset. |
| R_PROC | 4 | Marks start of PROC. One marker byte is inserted at r_offset. |
| R_ENDPROC | 5 | Marks end of PROC. |
| R_MAX (signed) | 6 | tos=(arg1>arg2?arg1:arg2) |
| R_OR | 7 | tos=(arg1|arg2) |
| R_XOR | 8 | tos=(arg1^arg2) |
| R_AND | 9 | tos=(arg1&arg2) |
| R_EQ | 10 | tos=(arg1==arg2) |
| R_NE | 11 | tos=(arg1!=arg2) |
| R_GT | 12 | tos=(arg1>arg2) |
| R_GE | 13 | tos=(arg1>=arg2) |
| R_LT | 14 | tos=(arg1<arg2) |
| R_LE | 15 | tos=(arg1<=arg2) |
| R_SHR | 16 | tos=(arg1>>arg2) note: arithmetic shift |
| R_SHL | 17 | tos=(arg1<<arg2) |
| R_ADD | 18 | tos=(arg1+arg2) |
| R_SUB | 19 | tos=(arg1-arg2) |
| R_MUL | 20 | tos=(arg1*arg2) |
| R_DIV | 21 | tos=(arg2/arg2) note: undefined if arg2==0 |
| R_REM | 22 | tos=(arg1%arg2) note: undefined if arg2==0 |
| R_PC | 23 | tose<-P |
| R_NEG | 24 | tos=-tos |
| R_INV | 25 | toss=~tos |
| R_REL | 26 | tos=<-O |
| R_SIZE | 27 | tos<-Sz section size |
| R_PUSH | 28 | tos<-symbol attribute or value. s1 holds flag saying which symbol attribute/value to be pushed. |
| R_DUP | 29 | tos<-tos (duplicates the top of stack) |
| R_IF | 30 | if (!tos) section data is skipped |
| R_IF_FIXED | 37 | Worst case branch (only for .macro). |
| R_ELSE | 32 | see R_IF (not supported in .macro). |
| R_ENDIF | 33 | see R_IF |
| R_START_MACRO | 34 | Informational, for error checking. |
| R_EXIT_MACRO | 35 | Linker stops inserting section data at r_offset. |
| R_PUT_PARAM | 36 | s1 holds index, s2 holds type information; the linker associates r_arg with these. |
| R_GET_PARAM | 37 | s1 holds index, s2 holds type information; the linker retrieves the value associated with these. |
| R_STORE | 38 | s1 holds index; the linker associates the value r_arg with the index for retrieval via R_FETCH. |
| R_FETCH | 39 | s1 holds index; the linker retrieves the value associated with the index. |
| R_MACRO_CALL | 40 | r_arg 1 is a symbol in .macro section whence to insert section data. One marker byte is present at r_offset. |
| R_EXIT | 41 | Terminates linker operation. |
| R_PROMPT | 42 | tos=integer input provided. |
| R_PRINT | | |
| R_ASSERT | | |

Key
s1,s2  Mean the r.nonbit.subtype1,2 field of the relocation.
S  Means the sum of r_arg1 and r_arg2 after interpreting them as symbol values or constant values according to RC_ARG1/2.
So  The value of symbol's st_other field.
O  Means the offset, relative to the base of the containing section, of the relocation entry symbol.
p  The absolute address of the relocation entry, r_offset (i.e., the PC).
Sz  Means the size of the relocation entry symbol's defining section.
tos  Top-of-stack, the value at the top of the internal linker stack.
tos<-  Pushes a 32-bit signed value onto the internal linker stack.
tos=arg1 op arg2  If both RC_ARG1 and RC_ARG2 are RO_UNUSED then both the arguments are assumed to be on the stack (with arg1 pushed first). Otherwise arg1 is S (i.e., the symbol value + addend) and arg2 is tos. The argument(s) on the stack are popped and the operation indicated as op is performed. Finally the result is pushed on the stack.

What is claimed is:

1. A computer-implemented method of forming an executable program from a plurality of object code modules, each object code module comprising a plurality of relocation instructions including at least one information output relocation having a field indicating information to be output, the method comprising:
   reading a relocation instruction from one of said object code modules; and
   when said read relocation instruction is an information output relocation, displaying the information indicated in said field in a human readable form.

2. The method of claim 1 wherein said information output relocation has an associated condition parameter, the method further comprising:

determining the value of said condition parameter and only performing said displaying step when said condition parameter is a predetermined value.

3. The method of claim 2 wherein said condition parameter is an expression, said expression being evaluated during said determining step.

4. The method of claim 2 wherein said condition parameter is a symbol having a predetermined value.

5. The method of claim 1 wherein said field of the information output relocation contains said information to be displayed.

6. The method of claim 1 wherein said at least one information output relocation contains a reference to a storage location, said storage location holding the information to be displayed.

7. The method of claim 1 wherein said displayed information is a prompt for a user to input further information and said method further comprises halting said steps of forming the executable program until said further input is supplied.

8. The method of claim 7 wherein said method is terminated in response to said further input.

9. The method of claim 1 wherein said method is terminated when said information is displayed.

10. The method of claim 1 wherein said information to be displayed includes an indicator string associated with a stored information item and said stored information item is substituted for said indicator string when said information is displayed.

11. The method of claim 10 wherein said information output relocation includes a field indicating the associated stored information item.

12. The method of claim 10 wherein said indicator string includes a sub-string denoting the format in which the stored information item is to be displayed.

13. The method of claim 1 wherein said displayed information is displayed on a visual display unit.

14. The method of claim 1 wherein said displayed information is printed as hard copy.

15. A computer-readable medium having a computer program stored thereon to provide a linker for preparing an executable program from a plurality of object code modules, each object code module comprising a plurality of relocating instructions including at least one information output relocation having a symbol field specifying a symbol that indicates information to be output, the linker comprising:
a relocation reader for reading said relocation instructions;
a program former for forming said executable program by executing said relocation instructions; and
a store for storing said symbol and the information to be output, said information to be output associated with said symbol and stored as textual information, wherein when said relocation reader reads an information output relocation said stored textual information is displayed in a human readable form.

16. The linker of claim 15 wherein said store is a symbol table.

17. A computing device for forming an executable program, comprising:
a module reader configured to read object code modules containing relocation instructions that include at least one information output relocation instruction having a field indicating information to be output;
a relocation module coupled to the module reader and configured to read the relocation instructions from each object code module;
a section data module coupled to the module reader and the relocation module and configured to hold section data from the object code modules and to enable patching in response to relocation instructions in the object code modules;
a program former coupled to the section data module and configured to form the executable program by executing the relocation instructions; and
a memory for storing the information to be displayed in human readable form and to output the information in human readable form when the relocation reader reads the information output relocation instruction.

18. A computer-implemented method of forming an executable program, comprising:
compiling source code into a plurality of object code modules, each object code module comprising a plurality of relocation instructions that include at least one information output relocation instruction having a field containing information to be output;
reading the relocation instructions; and
displaying in human readable form the information to be output from the field in the information output relocation instruction.

19. A computer-implemented method of forming an executable program, comprising:
compiling source code into a plurality of object code modules, each object code module including a plurality of relocation instructions that include at least one information output relocation instruction having a field containing the information to be displayed that includes a condition parameter;
reading the relocation instructions;
determining the value of the condition parameter; and
displaying in human readable form the information to be output from the field in the at least one information output relocation instruction when the condition parameter is a predetermined value.

20. A computer-implemented method of forming an executable program, comprising:
compiling source code into a plurality of object code modules, each object code module including a plurality of relocation instructions having at least one information output relocation instruction with a field that contains information to be output and a prompt for a user to input further information;
reading the relocation instructions;
displaying in human readable form the information to be output from the field in the at least one information output relocation instruction, including the prompt for user input; and
halting the forming of the executable program until input is supplied.

* * * * *